United States Patent [19]

Augustine et al.

[11] Patent Number: 5,258,340
[45] Date of Patent: Nov. 2, 1993

[54] MIXED TRANSITION METAL OXIDE CATALYSTS FOR CONVERSION OF CARBON MONOXIDE AND METHOD FOR PRODUCING THE CATALYSTS

[75] Inventors: Robert L. Augustine, Livingston; Setrak Tanielyan, South Orange, both of N.J.

[73] Assignee: Philip Morris Incorporated, New York, N.Y.

[21] Appl. No.: 656,306

[22] Filed: Feb. 15, 1991

[51] Int. Cl.$^5$ .................. B01J 23/72; B01J 23/80; B01J 23/82; B01J 23/84

[52] U.S. Cl. ........................... 502/60; 502/183; 502/184; 502/185; 502/242; 502/244; 502/313; 502/325; 502/326; 502/329; 502/330; 502/331; 502/337; 502/338

[58] Field of Search ............ 502/242, 244, 325, 326, 502/338, 60, 183, 184, 185, 329, 330, 331, 337

[56] References Cited

U.S. PATENT DOCUMENTS

| | | | |
|---|---|---|---|
| 3,480,531 | 11/1969 | Mulaskey | 502/242 X |
| 3,546,138 | 12/1970 | Callahan et al. | 252/456 |
| 3,873,469 | 3/1975 | Foster et al. | 502/242 |
| 3,887,740 | 6/1975 | Foster et al. | 428/116 |
| 3,894,965 | 7/1975 | Foster et al. | 252/460 |
| 3,909,455 | 9/1975 | Rainer | 252/466 |
| 4,080,286 | 3/1978 | Yanik et al. | 502/242 X |
| 4,206,087 | 6/1980 | Keith et al. | 252/462 |
| 4,256,609 | 3/1981 | Dale et al. | 252/455 |
| 4,299,734 | 11/1981 | Fujitani et al. | 252/462 |
| 4,908,192 | 3/1990 | Harrison et al. | 423/213.2 |

FOREIGN PATENT DOCUMENTS

| | | |
|---|---|---|
| 0395956 | 11/1990 | European Pat. Off. |
| 1315850 | 5/1973 | Japan. |
| 36387 | 8/1973 | Japan. |
| 139684 | 11/1977 | Japan. |
| 112793 | 9/1979 | Japan. |
| 0130835 | 1/1985 | Japan. |
| 238148 | 11/1985 | Japan. |
| 227842 | 10/1986 | Japan. |
| 252908 | 10/1988 | Japan. |

OTHER PUBLICATIONS

M. Haruta, N. Yamada, T. Kobayashi, and S. Iijima, "Gold Catalysts Prepared by Coprecipitation for Low-Temperature Oxidation of Hydrogen and of Carbon Monoxide," *Journal of Catalysis*, 115, pp. 301–309 (1989).

M. Haruta, T. Kobayashi, S. Iijima, and F. Delannay, "Ultrafine Gold Particles Immobilized with Oxides of Fe, Co, or Ni for the Catalytic Oxidation of Carbon Monoxide at −70° C.," *Proceedings–International Congress on Catalysts*, 3, pp. 1206–1213 (1988).

M. Haruta, T. Kobayashi, H. Sano, and N. Yamada, "Novel Gold Catalysts for the Oxidation of Carbon Monoxide at a Temperature far Below 0° C.," *Chemistry Letters*, 2, pp. 405–408 (1987).

M. Haruta, Y. Souma, and H. Sano, "Catalytic Combustion of Hydrogen: Development of Oxide Catalysts and Experimental Tests for Combustor Design," *Advanced Hydrogen Energy*, 2, pp. 1135–1147 (1981).

G. C. Bond and D. E. Webster, "Catalytic Activity of Reduced Noble Metal-Base Metal Mixed Oxides," *Chemistry and Industry*, pp. 878–879 (1967).

*Primary Examiner*—W. J. Shine
*Attorney, Agent, or Firm*—Denise L. Loring

[57] ABSTRACT

This invention relates to improved catalysts for the oxidation of carbon monoxide and methods of preparing these catalysts. The catalysts of this invention are prepared using a sequential precipitation process which generates catalysts that contain substantially layered metal oxides, both supported and unsupported, and, in some embodiments of the invention, a noble metal or mixture of noble metals layered on the metal oxides. These catalysts are particularly useful in smoking articles.

37 Claims, 2 Drawing Sheets

MIXED TRANSITION METAL OXIDE CATALYSTS FOR CONVERSION OF CARBON MONOXIDE AND METHOD FOR PRODUCING THE CATALYSTS

BACKGROUND OF THE INVENTION

This invention relates to improved catalysts for the oxidation of carbon monoxide and methods of preparing these catalysts. The catalysts of this invention convert carbon monoxide, produced by the combustion of carbonaceous heat sources, to a benign substance such as carbon dioxide. The catalysts and methods of this invention are particularly suitable for use in a smoking article such as that described in copending U.S. patent application Ser. No. 223,153, filed on Jul. 22, 1988, now U.S. Pat. No. 4,991,606, (PM-1322) and commonly assigned herewith.

The catalysts of this invention comprise mixed transition metal oxide catalysts and catalyst supports. According to the methods of this invention, the catalysts are prepared using a sequential precipitation process which generates catalysts that contain substantially layered metal oxides, and, in some embodiments, a noble metal or mixtures of noble metals layered on the metal oxides.

There have been previous attempts to provide catalysts containing metal oxides and mixed metal oxides alone and in combination with noble metals or their oxides for the oxidation of carbon monoxide to carbon dioxide. There have also been previous attempts to provide methods for the manufacture of such catalysts. These attempts have not produced catalysts having all of the advantages of the catalysts of the present invention.

For example, Callahan et al. U.S. Pat. No. 3,546,138 refers to oxidation catalysts that consist of a base catalyst containing the mixed oxides of antimony and iron, on a silica carrier, formed by coprecipitation. The formation of these catalysts is facilitated by a metal oxide promoter, which is incorporated into the base catalyst by coprecipitation or impregnation.

Haruta et al. U.S. Pat. No. 4,698,324 refers to a method for the manufacture of a composite catalyst having gold or a mixture of gold and an oxide of chromium, manganese, iron, cobalt, nickel, or copper, which is deposited on a carrier by coprecipitation. The method requires that urea and/or acetamide be used as a precipitant to facilitate the deposit of the gold/metal oxide mixture on a support in a single step reaction.

Haruta et al., *Journal of Catalysis*, 115, pp. 301–09 (1989), Haruta et al., *Proceedings—International Congress on Catalysts*, 3, pp. 1206–1313 (1988), and Haruta et al., *Chemistry Letters*, 2, pp. 405–408 (1987), refer to catalysts containing gold in combination with a single transition metal oxide that are prepared using a coprecipitation method.

Haruta, et al., *Advanced Hydrogen Energy*, 2, pp. 1135–47 (1981), refers to mixed transition metal oxide catalysts used in the catalytic combustion of hydrogen.

Bond et al., *Chemistry and Industry*, pp. 878–79 (1967), refers to mixed noble metal oxides for use in hydrogenation reactions. The mixed noble metal oxides contain platinum and either iron, cobalt, nickel or copper, or palladium and either cobalt or nickel.

Bond et al. United Kingdom patent 1,134,111 describes homogeneous catalyst mixtures comprising a platinum group metal oxide and a base metal oxide prepared by the fusion of the mixed salts to give the mixed oxides.

European patent application 0 130 835 describes composite mixed metal oxide catalysts of lanthanum, neodymium or praseodymium, or mixtures thereof, supported by aluminum oxide, prepared by a coprecipitation or an impregnation method.

Japanese patent publication no. Sho 61/1986-227842 refers to carbon monoxide removing catalysts that are all based on the presence of manganese dioxide and palladium. These catalysts achieve less carbon monoxide oxidation than the catalysts of the present invention.

Japanese patent publication no. Sho 50/1975-36387 refers to hopcalite catalysts consisting of manganese or manganese oxide that are prepared using a coprecipitation method.

Japanese patent publication no. Sho 52/1977-139684 refers to mixed metal oxide catalysts prepared through the decomposition of a combination of acetates.

Japanese patent publication no. Sho 54/1979-112793 refers to mixed metal oxide catalysts prepared using coprecipitated $Fe_2O_3/Al_2O_3$ on which a catalytically active metal is supported.

Japanese patent publication no. Sho 63/1988-252908 refers to ultra-fine gold particles which are supported by a metal oxide, prepared by the reduction of a gold salt in the presence of the metal oxide, a procedure commonly used to prepare metal catalysts supported on metal oxides.

These previous attempts differ from the methods of the present invention in that they use coprecipitation to prepare the catalysts, not sequential precipitation. As a result, the catalysts produced do not have the chemical properties of the catalysts of the present invention and, accordingly, do not have all of the advantages of the present invention.

SUMMARY OF THE INVENTION

Figure 1:
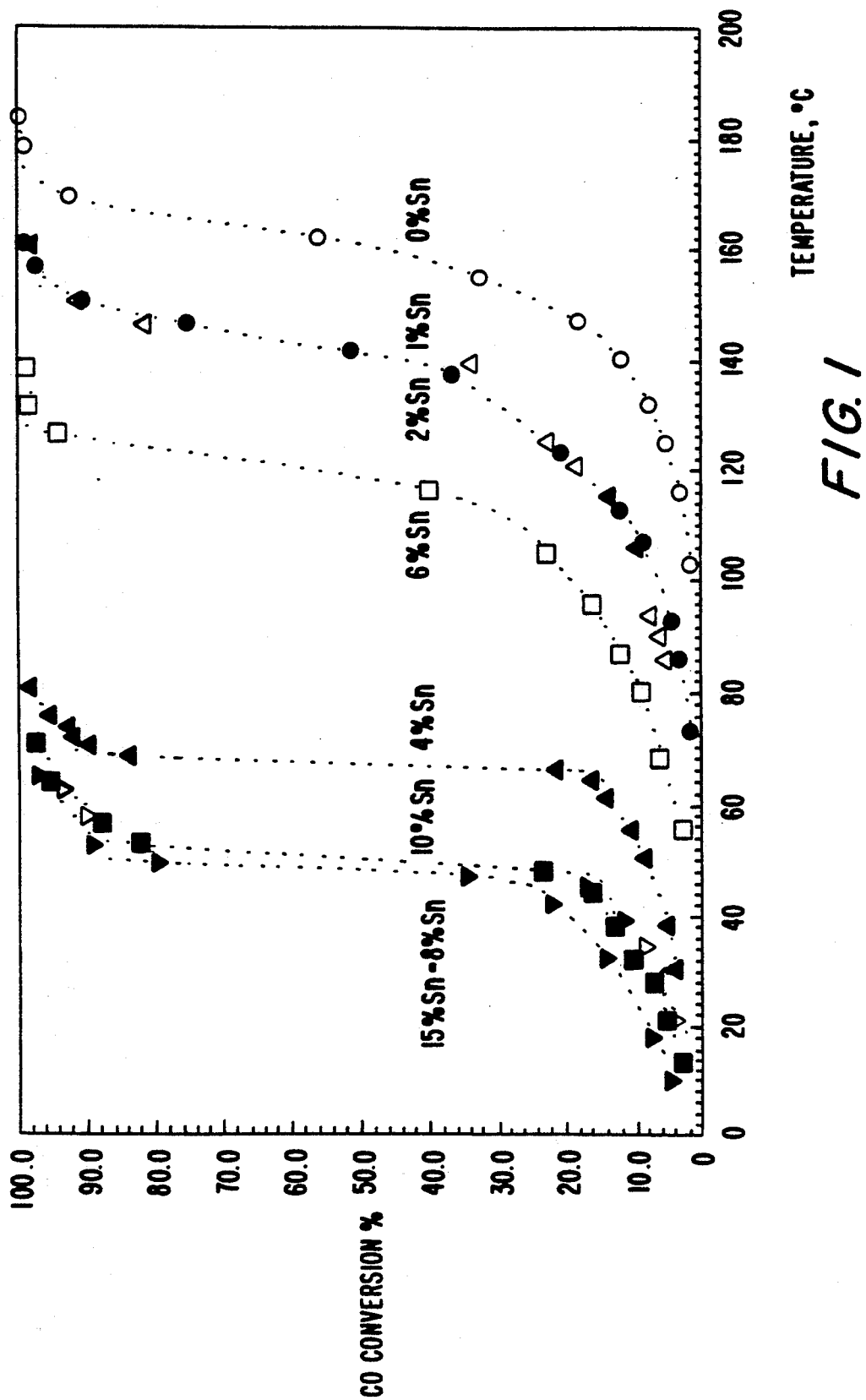
FIG. 1 represents the extent of CO oxidation with respect to temperature for one embodiment of a layered mixed oxide catalyst of this invention.

It is an object of this invention to provide catalysts for the conversion of carbon monoxide to a benign substance.

It is also an object of this invention to provide catalysts that are active at room temperature as well as at the temperatures reached in a combusting carbonaceous heat source.

It is a further object of this invention to provide catalysts that oxidize virtually all carbon monoxide produced upon combustion of a carbonaceous heat source.

It is yet a further object of this invention to provide a method for producing a layered metal oxide catalyst.

It is also an object of this invention to provide methods for producing layered metal oxide catalysts, both supported and unsupported, which allow for control of end-product composition.

In accordance with this invention, there is provided improved methods for making metal oxide catalysts which are particularly useful in a smoking article. The catalysts made by the methods of this invention comprise transition metal oxide catalysts having a plurality of metal oxide layers.

The catalysts of this invention are prepared by layering different metal oxides, one upon the other. It was discovered that the sequential precipitation of metal oxides, one upon the other, provides several advantages over prior coprecipitation methods. In coprecipitated oxides, both materials are uniformly distributed throughout the surface and the amount of catalytically active material on the surface is not easily determined or regulated. When sequential precipitation is used, the metal oxide that is precipitated last is present only on the surface and therefore its quantity can be determined and regulated. Furthermore, the sequential layering of the metal oxide precursor layers during preparation permits the formation of the required finely divided outer layer of metal oxide on the surface of the catalyst and facilitates the interaction between the metal oxides needed to provide a synergistic effect in the catalytic process.

The metal oxides can also be placed on a "support," an inert material that does not enter the carbon monoxide conversion reaction, but rather facilitates that reaction by enhancing the sites at which those reactions take place.

In another embodiment of this invention, noble metals, or mixtures thereof, are layered on the mixed transition metal oxide catalysts. These catalysts may also be placed on a support. Any noble metal may be used to make the catalysts of this invention, although considerations such as cost and availability typically enter into the decision as to which noble metal to use.

Noble metals are generally active over a wide range of temperatures and are known to have high activities at low temperatures. Noble metals, however, are also known to have low resistance to toxic compounds, such as lead and sulfur compounds, and are subject to sintering at high temperatures, which impair their effectiveness. Metal oxide catalysts have greater resistance to toxic compounds, but display reduced activity when used alone at lower temperatures.

The catalysts of this invention overcome these disadvantages inherent in noble metal and metal oxide catalysts previously used in carbon monoxide conversion. It was discovered that by layering different metal oxides, the resultant mixed metal oxide catalysts display increased activity at reduced temperatures. When noble metals are added to the metal oxide catalysts, the noble metal is layered onto the layered metal oxide structure. This catalyst takes advantage of the desirable characteristics of the noble metal, while at the same time the presence of the mixed metal oxides reduces the undesirable sintering effects usually seen with noble metals.

The catalysts of this invention undergo surprisingly active oxidation reactions at relatively low temperatures, i.e., between about 30° C. and about 40° C. As the temperature increases, i.e., to between about 90° C. and about 100° C., carbon monoxide is oxidized more rapidly to a benign substance. As used herein, a "benign substance" may include carbon dioxide, carbonate, and carbon.

A particular advantage of these catalysts is that when used in smoking articles they provide a significant level of oxidation of carbon monoxide but very low adsorption of desirable ingredients which provide the desirable flavor of the smoke.

According to one embodiment of this invention, the layered mixed transition metal oxide catalyst is produced by combining a solution of a metal oxide salt with an aqueous solution of a base to form a metal hydroxide. An aqueous solution of a salt of a second metal is then added to the suspension of the metal hydroxide forming a second layer of the metal hydroxide on the particles of the first metal hydroxide in the aqueous suspension. The resulting precipitate is then collected and heated to dehydrate each of the metal hydroxides of the suspension to produce a mixed metal oxide, which has one metal oxide layered on a core of a different metal oxide. This method can be modified to include as a first step the addition of an aqueous solution of the first metal oxide salt to a suspension of a support in aqueous base to produce a metal hydroxide layered on the support. The addition of an aqueous solution of a salt of a second metal produces a second metal hydroxide layer on the first metal hydroxide layer. After separation and heating, this method produces a two-layered mixed metal oxide on the support.

According to another embodiment of this invention, following the formation of the layered metal hydroxides as described above, an aqueous solution of formaldehyde is added to the suspension, followed by the addition of an aqueous solution of an acid or salt of a noble metal. This product is then heated to dehydrate each of the metal hydroxides and to reduce the noble metal salt or acid of the suspension to produce a noble metal layered upon a layered mixed metal hydroxide. As with the first embodiment, this method can be modified to include as a first step the addition of an aqueous solution of the first metal oxide salt to a suspension of a support in an aqueous solution of the base. After continuation of the procedure as described above, this method produces a noble metal layered on a layered mixed metal oxide on a support.

While the catalysts of this invention are particularly useful for the catalytic conversion of carbon monoxide emitted from smoking devices, it is to be understood that the catalysts are also useful for the catalytic conversion of carbon monoxide in other applications, including devices used for the conversion of carbon monoxide from carbonaceous heat sources such as automobile exhaust conversion devices and indoor air purifiers.

DETAILED DESCRIPTION OF THE INVENTION

The metal oxides of the invention may be formed from the salt of any metal that is capable of being converted to a metal oxide having catalytic properties. Preferably, the metal salt is selected from the group consisting of the nitrates or chlorides of titanium, chromium, iron, cobalt, nickel, copper, zinc, molybdenum, tungsten, and tin. More preferred metal salts are cobalt(II)nitrate having the formula $Co(NO_3)_2.6H_2O$ and iron(III)nitrate having the formula $Fe(NO_3)_3.9H_2O$. The most preferred embodiments consist of the salt of the first metal oxide being either cobalt(II)nitrate or iron(III)nitrate.

The metal salt is first combined with a base which produces the desired result of converting the metal nitrate or chloride to an insoluble metal hydroxide. Any number of bases may be used that are suitable for this purpose. Preferred bases include an alkali metal hydroxide, carbonate or bicarbonate, and urea or ammonia. More preferred bases contain an alkali or alkaline earth metal cation and an anion selected from the group consisting of hydroxides and bicarbonates, and include sodium bicarbonate, sodium hydroxide, potassium carbonate, and lithium hydroxide. Most preferably, the base is sodium carbonate.

The combining of the metal salt and the base can be accomplished using one of two methods. Either the aqueous solution of the metal salt can be added to the solution of the base, or the solution of the base can be added to the aqueous solution of the metal salt. In combining the metal salt and the base, a sufficient amount of the base should be present to convert all of the metal salt to a metal hydroxide.

Prior to the addition of the second metal salt to produce the second metal hydroxide, the first metal hydroxide may be separated, purified, and possibly heated and calcined. The resulting material can then be placed in a solution of aqueous base and the preparation procedure continued by the addition of the solution of the second metal salt.

Following the formation of the metal hydroxide from the reaction of the metal salt and the base, a solution of a second metal salt is added. This metal salt should also be a salt of a metal that is capable of being converted to a metal oxide having catalytic properties. Preferably, the second metal salt is selected from the group consisting of the nitrates and chlorides of titanium, chromium, iron, cobalt, nickel, copper, zinc, molybdenum, tungsten, and tin. A more preferred metal salt is tin chloride having the formula $SnCl_2$. In the most preferred embodiments, where the salt of the first metal oxide is cobalt(II)nitrate the salt of the second metal oxide is tin(II)chloride, and where the salt of the first metal oxide is iron(III)nitrate the salt of the second metal oxide is selected from the group consisting of cobalt(II)nitrate and tin(II)chloride.

In combining the second metal salt and the metal hydroxide, a sufficient amount of the metal salt should be added to yield a suitable second layer of metal oxide. Preferably, the ratio of the metal salt to the metal hydroxide should range from about 1:50 to about 1:4, and, more preferably, from about 2:50 to about 1:10.

To produce a layered mixed metal oxide which is on a support, the base solution that is combined with the first metal salt may be first combined with a suspension of a support material. The base can be combined with the support suspension in a solvent.

The preferred solvent for these procedures is water. However, the use of other solvents, particularly aqueous mixtures, is not precluded. The primary criteria for the selection of the solvent is its capability to dissolve both metal salts and the base and yet not dissolve the metal hydroxides produced.

Any number of support materials are suitable as a support for the catalyst. The choice of an effective support for the present invention depends upon the intended use of the catalyst. Useful supports for catalysts used in smoking devices include ceramics and zeolites. Preferred ceramics include ceramics of alumina and titania. Preferred zeolites include any of a variety of man-made and naturally occurring crystalline aluminosilicates having a small enough pore structure to allow for the passage of carbon monoxide but not the larger molecules present in gas phase cigarette smoke. Preferred pore sizes may range from about 3 Å to about 20 Å. More preferred pore sizes range from about 5 Å to about 13 Å.

Other support materials, e.g., other insulator oxides and semiconductor oxides, porous carbon or a metal mesh, foam, or pellet, are useful for catalysts in such applications as automobile exhaust conversion devices and indoor air purifiers. Porous paper is also a suitable support material.

An additional layer of a noble metal, or mixture of two noble metals, may be added upon the layered metal oxide catalyst of this invention. Preferred noble metals of the invention include any of the group VIII and Ib noble metal, alone or in combination with a different noble metal, specifically gold, silver, platinum, palladium, rhodium, ruthenium, and iridium, and mixtures thereof. More preferred noble metals are gold, platinum, and palladium.

In combining the metal oxide and the noble metal, sufficient amount of the noble metal should be added to yield a suitable layer of the noble metal. Preferably, the noble metal should range up to about 5.0% by weight of the layered metal hydroxide mixture, and, more preferably, between about 0.1% and about 1.0% by weight of the layered metal hydroxide mixture.

The mixed hydroxides are then separated by any known method including filtration or centrifugation. Following this separation step, the precipitate is washed thoroughly. It is believed that the washing operation removes soluble salts and other impurities from the catalyst, which may hinder the activity of the catalyst. While water is an acceptable washing agent because of its low cost and availability, and deionized water is preferred, other suitable solvents may be employed. The catalyst may be washed by contacting the catalyst with the solvent by known techniques, e.g., passing the solvent through a column containing the catalyst. The washing time may vary widely, up t o about 12 hours, and preferably up to about 2 hours. Ambient temperature is suitable for the washing step, although higher or lower temperatures may be employed.

The resulting precipitate is then heated to dehydrate the layered metal hydroxide to form the layered metal oxide catalyst. The heating step is generally carried out in an inert or oxidizing (i.e., calcining) atmosphere, preferably in a free oxygen containing gas atmosphere, such as air. Preferably, the reaction takes place at a temperature between about 95° C. and about 500° C., more preferably, between about 300° C. and about 400° C. The heat may be applied uniformly throughout the heating step or may be gradually increased until the appropriate reaction temperature is reached. This heating procedure is generally carried out for between 1 hour and 12 hours so as to calcine the hydroxide.

EXAMPLE 1

$SnO_2Co_3O_4$

We prepared a layered mixed metal oxide catalyst consisting of tin oxide ($SnO_2$) layered over cobalt-(II,III)oxide ($Co_3O_4$), using a sequential precipitation method. In this method, we added 10 ml of an aqueous solution of 6.75 grams of cobalt(II)nitrate $Co(NO_3)_2 \cdot 6H_2O$ dropwise to 30 ml of an aqueous solution of 2 molar $Na_2CO_3$ under vigorous stirring conditions. This suspension was stirred vigorously for one-half hour, yielding a cobalt hydroxide ($Co(OH)_2$) precipitate. To this suspension, we added dropwise 10 ml of an aqueous solution of tin(II)chloride ($SnCl_2$), in varying concentrations given below for different experimental runs, under vigorous stirring conditions. This suspension was then stirred for one hour and the precipitate containing tin hydroxide ($Sn(OH)_2$) layered on cobalt hydroxide ($Co(OH)_2$) was separated, washed and centrifuged several times until an absence of detectable quantities of Cl⁻ was found. We dried the resulting precipitate for 12 hours at 95° C. and then calcined it at 380° C. for 4 hours. This calcination procedure yielded a solid catalyst comprising $SnO_2$ layered over a $Co_3O_4$ core.

We prepared this catalyst using this method over a range of different concentrations of the $SnCl_2$ solution. The weight of $SnCl_2$ added was varied from 0.0 grams to 0.862 grams. Using this method, the temperature at which a level of 50% conversion of CO was reached ($T_{50}$° C.) was examined to determine the optimum level of $SnCl_2$ concentration. The results are given in the following table:

| % Sn | $SnCl_2$ (gms) | $Co(NO_3)_2$ (gms) | $T_{50}$° C. |
|---|---|---|---|
| 15 | 0.862 | 6.75 | 48 |
| 10 | 0.575 | 6.75 | 49 |
| 8 | 0.455 | 6.75 | 49 |
| 6 | 0.334 | 6.75 | 119 |
| 4 | 0.220 | 6.75 | 68 |
| 2 | 0.110 | 6.75 | 139 |
| 1 | 0.050 | 6.75 | 139 |
| 0 | 0.000 | 6.75 | 161 |

This table shows that the preferred concentration of $SnCl_2$ for catalytic conversion of CO was 0.445 grams. The overall temperature ranges through which the percentage conversion of carbon monoxide is from 0.0% to 100% for the catalysts prepared in this method are shown in FIG. 1.

EXAMPLE 2

$SnO_2Co_3O_4$

We repeated the general procedure of example 1, with the exception that in the first step of the process we added the solution of the base, 2 molar $Na_2CO_3$, under vigorous stirring conditions to an aqueous solution of 6.75 grams of $Co(NO_3)_2.6H_2O$ until a pH of between 8.5 and 9 was obtained. As in example 1, a 10 ml aqueous solution of $SnCl_2$, in varying concentrations given below for different experimental runs, was then added under vigorous stirring conditions. The resulting precipitate, comprising $Sn(OH)_2$ layered over $Co(OH)_2$, was then separated, washed, dried, and calcined using the procedures described in example 1.

We prepared the catalyst using this method over a range of different concentrations of the $SnCl_2$ suspension. The weight of $SnCl_2$ added was varied from 0.0 grams to 0.862 grams. Using this method, the temperature at which a level of 50% conversion of CO was reached ($T_{50}$° C.) was examined to determine the optimum level of $SnCl_2$ concentration. The results are given in the following table:

| % Sn | $SnCl_2$ (gms) | $Co(NO_3)_2$ (gms) | $T_{50}$° C. |
|---|---|---|---|
| 15 | 0.862 | 6.75 | 126 |
| 10 | 0.575 | 6.75 | 105 |
| 8 | 0.455 | 6.75 | 89 |
| 6 | 0.334 | 6.75 | 62 |
| 4 | 0.220 | 6.75 | 58 |
| 2 | 0.110 | 6.75 | 105 |
| 1 | 0.050 | 6.75 | 126 |
| 0 | 0.000 | 6.75 | — |

Figure 2:
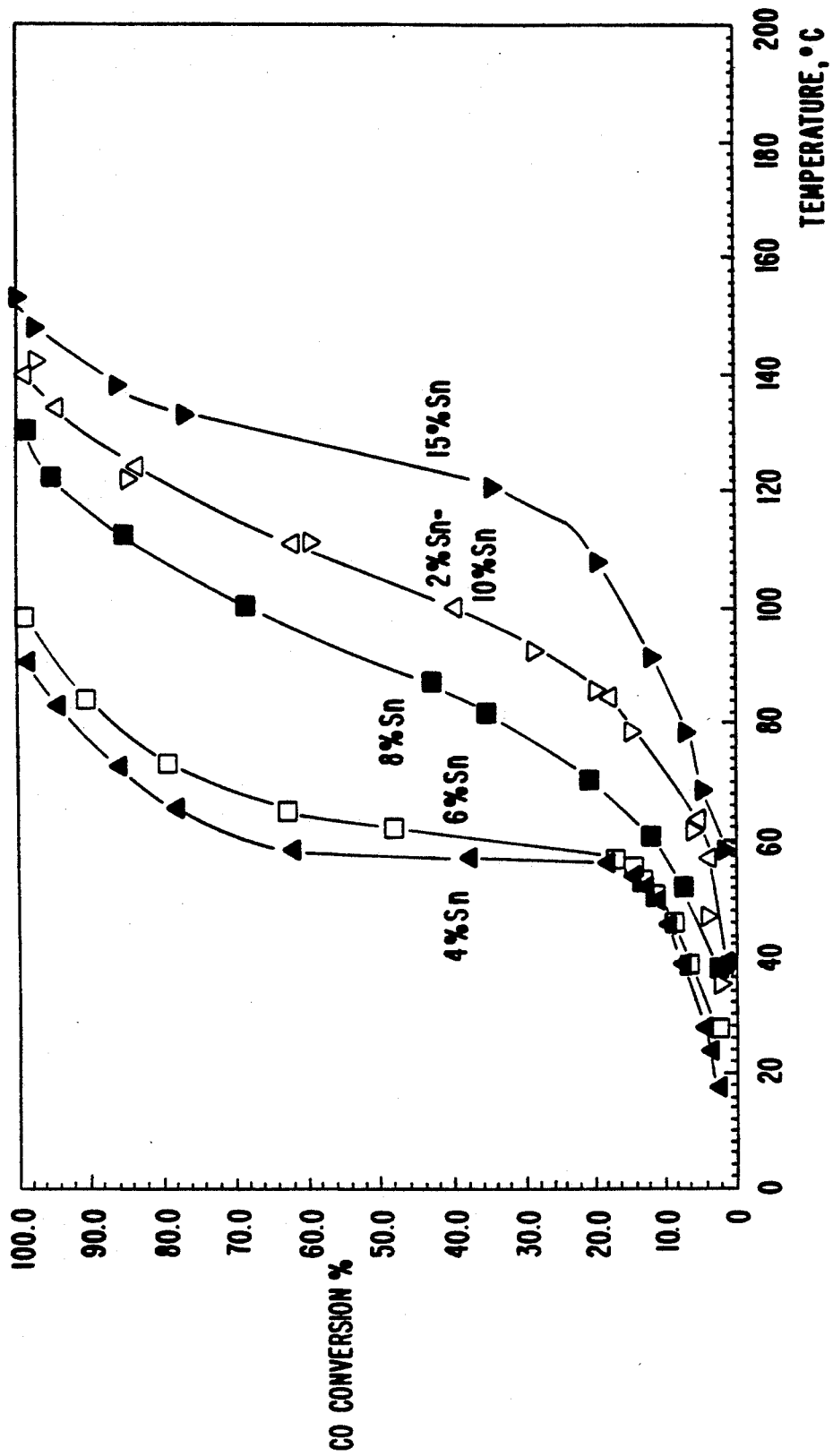
FIG. 2 represents the extent of CO oxidation with respect to temperature for another embodiment of a layered mixed oxide catalyst of this invention.

This table shows that the preferred concentration of $SnCl_2$ for catalytic conversion of CO was between 0.220 grams and 0.334 grams. The overall temperature ranges through which the percentage conversion of carbon monoxide is from 0.0% to 100% for the catalysts prepared in this method are shown in FIG. 2.

EXAMPLE 3

$Au/1SnO_2Co_3O_4SiO_2$

We prepared a layered mixed metal oxide catalyst consisting of gold layered on a second metal oxide, $SnO_2$, layered on a first metal oxide, $Co_3O_4$, which was layered on a support of silicon oxide ($SiO_2$). In this procedure, we added dropwise 40 ml of an aqueous solution consisting of 5.25 grams of $Co(NO_3)_2.6H_2O$ to 70 ml of an aqueous suspension containing 15.0 grams of $SiO_2$ (Davison, grade 56) and 2 molar $Na_2CO_3$, under vigorous stirring conditions. To this suspension was added 10 ml of an aqueous solution of 0.0452 grams of $SnCl_2$, also under vigorous stirring conditions. To this suspension was added 0.5 ml of an aqueous solution of 37% formaldehyde (HCHO). To this suspension was added 10 ml of an aqueous solution of chloroauric acid ($HAuCl_4$) at a rate of 2 ml per minute. The resulting suspension was then stirred for two hours and the resulting precipitate was separated, washed and centrifuged several times until an absence of detectable quantities of Cl⁻ was found. We dried the resulting precipitate for 12 hours at 95° C. and then calcined it at 380° C. for 4 hours. This calcination procedure yielded a solid catalyst comprising gold layered on $SnO_2$, layered on $Co_3O_4$, which was layered over a core of $SiO_2$ support. Using this method, we found that $T_{50}$° C. was reached at 140° C. using the preferred concentration by atomic weight comprising 2% Au, 1.2% $SnO_2$ and 7.4% $Co_3O_4$.

EXAMPLE 4

$Au/2SnO_2Co_3O_4SiO_2$

We repeated the procedure of example 3, with the exception that in the second step of the procedure, we added 10 ml of an aqueous solution containing 0.0904 grams of $SnCl_2$. This method yielded a modification of the catalyst of example 3, $Au/2SnO_2Co_3O_4SiO_2$. Using this procedure, we found that $T_{50}$° C. was reached at 240° C. using the preferred concentration by atomic weight comprising 1.9% Au, 2.3% $SnO_2$, and 6.9% $Co_3O_4$.

EXAMPLE 5

$Pt/1SnO_2Co_3O_4SiO_2$

We prepared a layered mixed metal oxide catalyst consisting of platinum layered on a second metal oxide, $SnO_2$, layered on a first metal oxide, $Co_3O_4$, which was layered on an $SiO_2$ support. In this method, we added 40 ml of an aqueous solution of 5.25 grams of $Co(NO_3)_2.6H_2O$ dropwise to 70 ml of an aqueous suspension of 15 grams of $SiO_2$ (Davison, grade 56) and 2 molar $Na_2CO_3$, under vigorous stirring conditions. To this suspension was added 10 ml of an aqueous solution of 0.0452 grams of $SnCl_2$, also under vigorous stirring conditions. This suspension was heated to 90° C., and then to this suspension was added an aqueous suspension of 10 ml of 0.1036 grams of chloroplatinic acid ($H_2PtCl_6.6H_2O$) at a rate of 1 milliliter per minute. To this suspension was added 0.5 ml of an aqueous solution of HCHO. The resulting suspension was kept at the 90° C. temperature for one hour. The resulting suspension was then stirred for two hours and the precipitate was separated, washed and centrifuged several times until an absence of detectable quantities of $Cl^-$ was found. We dried the resulting precipitate for 12 hours at 95° C. and then calcined at 380° C. for 4 hours. This calcination procedure yielded a solid catalyst comprising platinum layered on $SnO_2$, layered on $Co_3O_4$, layered over an $SiO_2$ support. Using this procedure, we found that $T_{50}$° C. was reached at 196° C. using the preferred concentration by atomic weight of 2.1% Pt, 1.2% $SnO_2$, and 7.6% $Co_3O_4$.

EXAMPLE 6

Pt/2SnO2Co3O4SiO2

We repeated the procedure of example 5, with the exception that the 10 ml aqueous solution of $SnCl_2$ contained 0.0904 grams of $SnCl_2$, and the HCHO solution was not added. This amended procedure yielded a modification of the catalyst of example 5, platinum layered $2SnO_2$ layered on $Co_3O_4$, on a catalyst support of $SiO_2$. Using this procedure, we found that $T_{50}$° C. was reached at 205° C. using the preferred concentration by atomic weight of 2% Pt, 2.3% $SnO_2$ and 6.8% $Co_3O_4$.

EXAMPLE 7

Pd/1SnO2Co3O4SiO2

We prepared a layered mixed metal oxide catalyst consisting of palladium layered on a second metal oxide, $SnO_2$, layered on a first metal oxide, $Co_3O_4$, which was layered on an $SiO_2$ support. In this method, we added 40 ml of an aqueous solution of 5.25 grams of $Co(NO_3)_2 \cdot 6H_2O$ dropwise to a 70 ml aqueous suspension of 15 grams of $SiO_2$ (Davison, grade 56) and 2 molar $Na_2CO_3$, under vigorous stirring conditions. To this suspension was added 10 ml of an aqueous solution of 0.0452 grams of $SnCl_2$, also under vigorous stirring conditions. This suspension was heated to 90° C., and then to this suspension was added an aqueous solution of 10 ml of 0.0589 grams of sodium chloropallidate ($Na_2PdCl_4$) at a rate of 1 milliliter per minute. To this suspension was added 0.05 ml of an aqueous solution of HCHO. The resulting suspension was kept at the 90° C. temperature for 10 minutes. The resulting suspension was then stirred for two hours and the precipitate was separated, washed and centrifuged several times until an absence of detectable quantities of $Cl^-$ was found. We dried the resulting precipitate for 12 hours at 95° C. and then calcined it at 380° C. for 4 hours. This calcination procedure yielded a solid catalyst comprising palladium layered on the $SnO_2$, layered on $Co_3O_4$, layered over an $SiO_2$ support. Using this procedure, we found that $T_{50}$° C. was reached at 144° C. using the preferred concentration by atomic weight comprising 1.1% pd, 1.2% $SnO_2$ and 7.6% $Co_3O_4$.

EXAMPLE 8

Pd/2SnO2Co3O4SiO2

We repeated the procedure of example 7, with the exception that the 10 ml aqueous solution of $SnCl_2$ contained 0.0904 grams of $SnCl_2$. This amended procedure yielded a modification of the catalyst of example 7, palladium layered on $2SnO_2$ layered on $Co_3O_4$, on an $SiO_2$ support. Using this procedure, we found that $T_{50}$° C. was reached at 161° C. using the preferred concentration by atomic weight comprising 1.1% Pd, 2.3% $SnO_2$, and 6.4% $Co_3O_4$.

EXAMPLE 9

AuPd/SnO2Co3O4

We prepared a layered mixed metal oxide catalyst consisting of a mixture of gold and palladium layered on a second metal oxide, $SnO_2$, layered on a first metal oxide, $Co_3O_4$. In this method, we added 15 ml of an aqueous solution of 6.75 grams of $Co(NO_3)_2 \cdot 6H_2O$ dropwise under vigorous stirring conditions to a 40 ml aqueous solution containing 2 molar $Na_2CO_3$. To this suspension was added 10 ml of an aqueous solution of 0.0862 grams of $SnCl_2$, also under vigorous stirring conditions. To this suspension was added an aqueous solution of 15 ml of a combined solution of 0.031 grams of palladium nitrate ($Pd(NO_3)_2$) and 0.053 grams of chloroauric acid ($HAuCl_4$). The resulting suspension was then stirred for two hours and the precipitate was separated, washed and centrifuged several times until an absence of detectable quantities of $Cl^-$ was found. We dried the resulting precipitate for 12 hours at 95° C. and then calcined at 380° C. for 4 hours. This calcination procedure yielded a solid catalyst comprising a mixture of 0.5% gold and 0.5% palladium layered on $SnO_2$, layered on $Co_3O_4$.

We prepared the catalyst using this procedure over a range of different concentrations of Au and Pd. The results are given in the following table:

| % Au | % Pd | % $SnO_2$ | % $Co_3O_4$ | $T_{50}$° C. |
|------|------|-----------|-------------|--------------|
| 1.0 | 0.0 | 15.0 | 84.0 | 46 |
| 0.8 | 0.2 | 15.0 | 84.0 | 75 |
| 0.6 | 0.4 | 15.0 | 84.0 | 131 |
| 0.5 | 0.5 | 15.0 | 84.0 | 128 |
| 0.4 | 0.6 | 15.0 | 84.0 | 109 |
| 0.2 | 0.8 | 15.0 | 84.0 | 114 |
| 0.0 | 1.0 | 15.0 | 84.0 | 68 |

EXAMPLE 10

PtRh/CuOCo3O4

We prepared a layered mixed metal oxide catalyst consisting of a mixture of platinum and rhodium layered on a second metal oxide, copper oxide (CuO), layered on a first metal oxide, $Co_3O_4$. In this procedure, we added dropwise 15 ml of an aqueous solution consisting of 6.75 grams of $Co(NO_3)_2 \cdot 2H_2O$ to 35 ml of an aqueous solution of 2 molar $Na_2CO_3$, under vigorous stirring conditions. To this suspension was added 10 ml of an aqueous solution of 0.534 grams of copper nitrate ($Cu(NO_3)_2$), also under vigorous stirring conditions. This suspension was stirred for one half hour. To this suspension was then added an aqueous solution of 10 ml of a combined solution of 0.066 grams of chloroplatinic acid ($H_2PtCl_6 \cdot 6H_2O$) and 0.033 grams of rhodium chloride ($RhCl_3$). The suspension was then heated to 80° C. and 1 ml of HCHO was added. The resulting suspension was then stirred for one hour, after which the precipitate was separated, washed and centrifuged several times until an absence of detectable quantities of $Cl^-$ was found. We dried the resulting precipitate for 12 hours at 95° C. and then calcined it at 380° C. for 4 hours. This calcination procedure yielded a solid catalyst comprising a mixture of 0.5% platinum and 0.5% rhodium layered on CuO, layered on $Co_3O_4$.

We prepared the catalyst using this procedure over a range of different concentrations of Pt and Rh. The results are given in the following table:

| % Pt | % Rh | % CuO | % Co₃O₄ | T₅₀° C. |
|---|---|---|---|---|
| 1.0 | 0.0 | 9.0 | 90.0 | 81 |
| 0.8 | 0.2 | 9.0 | 90.0 | 71 |
| 0.6 | 0.4 | 9.0 | 90.0 | 81 |
| 0.5 | 0.5 | 9.0 | 90.0 | 90 |
| 0.4 | 0.6 | 9.0 | 90.0 | 97 |
| 0.2 | 0.8 | 9.0 | 90.0 | 90 |
| 0.0 | 1.0 | 9.0 | 90.0 | 81 |

We claim:

1. An oxidation catalyst for use in low temperature oxidation of carbon monoxide comprising a plurality of metal oxide layers, wherein at least one of said layers comprises cobalt(II,III)oxide and at least another one of said layers comprises a metal oxide selected from the group consisting of the oxides of iron, nickel, copper, zinc, molybdenum, tungsten, and tin.

2. The catalyst of claim 1, wherein the catalyst consists of two metal oxide layers and the ratio of weight of the second metal oxide to the weight of the first metal oxide is from about 1:50 to about 1:4.

3. The catalyst of claim 1, wherein the catalyst consists of two metal oxide layers and the ratio of weight of the second metal oxide to the weight of the first metal oxide is form about 2:50 to about 1:10.

4. A layered metal oxide catalyst for use in low temperature oxidation of carbon monoxide comprising a layer of cobalt(II,III)oxide and a layer of tin oxide.

5. The catalyst of claim 1, further comprising one or more noble metals, the noble metal or mixture being layered upon the other metal oxide layer.

6. The catalyst of claim 5, wherein the ratio of the weight of the noble metals to the weight of the metal oxides is from about 0.1% to about 5.0%.

7. The catalyst of claim 5, wherein the ratio of the weight of the noble metals to the weight of the metal oxides is from about 0.1% to about 1.0%.

8. The catalyst of claim 5, wherein the noble metal is selected from the group consisting of gold, silver, platinum, palladium, rhodium, ruthenium and iridium, and mixtures thereof.

9. The catalyst of claim 1 or 5, further comprising a support material upon which the first metal oxide is layered.

10. The catalyst of claim 9, wherein the support material is selected from the group consisting of a ceramic, a zeolite, porous carbon, porous paper, and a metal mesh.

11. A layered metal oxide catalyst for use in oxidizing carbon monoxide comprising a support material, two metal oxide layers and an outer noble metal layer, wherein the support material is silicon dioxide, the first metal oxide layer is cobalt(II,III)oxide, the second metal oxide layer is tin oxide, and the noble metal is selected from the group consisting of gold, platinum and mixtures thereof.

12. A layered metal oxide catalyst for use in oxidizing carbon monoxide comprising a support material, two metal oxide layers and an outer noble metal layer, wherein the support material is silicon dioxide, the first metal oxide layer is cobalt(II,III)oxide, the second metal oxide is copper oxide, and the noble metal comprises platinum and rhodium.

13. Method for producing a layered metal oxide catalyst for use in oxidizing carbon monoxide comprising the steps of:
(a) adding an aqueous solution of a salt of a first metal to an aqueous solution of a base;
(b) adding to the suspension of step (a) an aqueous solution of a salt of a second metal;
(c) isolating the precipitate resulting from step (b); and
(d) heating the precipitate, wherein the metal oxides are selected from the group consisting of the oxides of iron, cobalt, nickel, copper, zinc, molybdenum, tungsten, and tin.

14. The method of claim 13, wherein in step (a) the base solution is added to the salt of the first metal oxide.

15. The method of claim 13 or 14, wherein the salt of the first metal is selected from the group consisting of cobalt(II)nitrate and iron(III)nitrate and the salt of the second metal is selected from the group consisting of cobalt(II)nitrate and tin(II)chloride, wherein the second metal salt is different from the first metal salt.

16. The method of claim 13 or 14, wherein the base is selected from the group consisting of sodium bicarbonate, sodium hydroxide, potassium carbonate and lithium hydroxide.

17. The method of claim 13 or 14, wherein a suspension of a support is first added to the aqueous solution of the base.

18. The method of claim 17, wherein the support is selected from the group consisting of a ceramic, a zeolite, porous carbon, porous paper, and a metal mesh.

19. The method of claim 13 or 14, comprising the additional step of isolating the precipitate resulting from step (a) and adding it to the solution of step (b).

20. The method of claim 13 or 14, wherein the precipitate is heated to a temperature between about 95° C. and about 500° C.

21. The method of claim 13 or 14, wherein the precipitate is heated to a temperature between about 300° C. and about 400° C.

22. The method of claim 13 or 14, wherein the precipitate is heated for a period of between about 1 hour and about 12 hours.

23. A method for producing a layered metal oxide catalyst for use in oxidizing carbon monoxide comprising a noble metal layered upon a second metal oxide which is layered upon a first metal oxide, comprising the steps of:
(a) adding an aqueous solution of a salt of a first metal to an aqueous solution of a base;
(b) adding to the suspension of step (a) an aqueous solution of a salt of a second metal;
(c) adding an aqueous solution of formaldehyde;
(d) adding an aqueous solution of a salt of a noble metal;
(e) isolating the precipitate resulting from step (d); and
(f) heating the precipitate,
wherein the metal oxide are selected from the group consisting of iron, cobalt, nickel, copper, zinc, molybdenum, tungsten, and tin, and wherein the noble metal is selected from the group consisting of gold, silver, platinum, palladium, rhodium, ruthenium and iridium, and mixtures thereof.

24. The method of claim 23, wherein in step (a) the base solution is added to the salt of the first metal oxide.

25. The method of claim 23 or 24, wherein the salt of the first metal is selected from the group consisting of cobalt(II)nitrate and iron(III)nitrate and the salt of the second metal is selected from the group consisting of cobalt(II)nitrate and tin(II)chloride, wherein the second metal salt is different from the first metal salt.

26. The method of claim 23 or 24, wherein the base is selected from the group consisting of sodium bicarbonate, sodium hydroxide, potassium carbonate and lithium hydroxide.

27. The method of claim 23 or 24, wherein a suspension of a support is first added to the aqueous solution of the base.

28. The method of claim 27, wherein the support is selected from the group consisting of a ceramic, a zeolite, porous carbon, porous paper and a metal mesh.

29. The method of claim 23 or 24, comprising the additional step of isolating the precipitate resulting from step (a) and adding it to the solution of step (b).

30. The method of claim 23 or 24, wherein the precipitate is heated to a temperature between 95° C. and 500° C.

31. The method of claim 23 or 24, wherein the precipitate is heated to a temperature between 300° C. and 400° C.

32. The method of claim 23 or 24, wherein the precipitate is heated for a period of between about 1 hour and about 12 hours.

33. An oxidation catalyst for use in a smoking article comprising a plurality of metal oxide layers, wherein at least one of said layers comprises cobalt(II,III)oxide and at least another one of said layers comprises a metal oxide selected from the group consisting o the oxides of iron, nickel, copper, zinc, molybdenum, tungsten, and tin.

34. A layered metal oxide catalyst for use in a smoking article comprising a support material, two metal oxide layers and an outer noble metal layer, wherein the support material is silicon dioxide, the first metal oxide layer is cobalt(II,III)oxide, the second metal oxide layer is tin oxide, and the noble metal is selected from the group consisting of gold, platinum and mixtures thereof.

35. A layered metal oxide catalyst for use in a smoking article comprising a support material, two metal oxide layers and an outer noble metal layer, wherein the support material is silicon dioxide, the first metal oxide layer is cobalt(II,III)oxide, the second metal oxide layer is copper oxide, and the noble metal comprises platinum and rhodium.

36. A layered metal oxide catalyst for use in low temperature oxidation of carbon monoxide made by the method comprising the steps of:
(a) adding an aqueous solution of a salt of a first metal to an aqueous solution of a base;
(b) adding to the suspension of step (a) an aqueous solution of a salt of a second metal;
(c) isolating the precipitate resulting from step (b);
(d) heating the precipitate, wherein the metal oxides are selected from the group consisting of the oxides of iron, cobalt, nickel, copper, zinc, molybdenum, tungsten, and tin.

37. A layered metal oxide catalyst for use in low temperature oxidation of carbon monoxide comprising a noble metal layered upon a second metal oxide which is layered upon a first metal oxide made by the method comprising the steps of:
(a) adding an aqueous solution of a salt of a first metal to an aqueous solution of a base;
(b) adding to the suspension of step (a) an aqueous solution of a salt of a second metal;
(c) adding an aqueous solution of formaldehyde;
(d) adding an aqueous solution of a salt of a noble metal;
(e) isolating the precipitate resulting from step (d); and
(f) heating the precipitate,
wherein the metal oxides are selected from the group consisting of the oxides of iron, cobalt, nickel, copper, zinc, molybdenum, tungsten, and tin, and wherein the noble metal is selected from the group consisting of gold, silver, platinum, palladium, rhodium, ruthenium, osmium and iridium, and mixtures thereof.

* * * * *